(12) United States Patent
Abiraman et al.

(10) Patent No.: US 11,436,533 B2
(45) Date of Patent: Sep. 6, 2022

(54) TECHNIQUES FOR PARALLEL MODEL TRAINING

(71) Applicant: Capital One Services, LLC, McLean, VA (US)

(72) Inventors: Karthick Abiraman, Plano, TX (US); Bing Liu, Frisco, TX (US); Saranya Thangaraj, Frisco, TX (US); Paul Ponce Portugal, Plano, TX (US); Sang Jin Park, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 341 days.

(21) Appl. No.: 16/845,597

(22) Filed: Apr. 10, 2020

(65) Prior Publication Data

US 2021/0319355 A1 Oct. 14, 2021

(51) Int. Cl.
*G06N 20/00* (2019.01)
(52) U.S. Cl.
CPC .................................. *G06N 20/00* (2019.01)
(58) Field of Classification Search
None
See application file for complete search history.

(56) References Cited

U.S. PATENT DOCUMENTS

| | | | |
|---|---|---|---|
| 2012/0226639 A1* | 9/2012 | Burdick | G06F 9/4843 706/12 |
| 2015/0019214 A1 | 1/2015 | Wang et al. | |
| 2015/0324690 A1* | 11/2015 | Chilimbi | G06N 3/063 706/27 |
| 2016/0103901 A1 | 4/2016 | Kadav et al. | |
| 2016/0132787 A1* | 5/2016 | Drevo | G06N 20/10 706/12 |
| 2016/0148115 A1* | 5/2016 | Sirosh | G06N 20/00 706/11 |
| 2016/0321776 A1 | 11/2016 | Zou et al. | |

(Continued)

OTHER PUBLICATIONS

Sparks et al., "MLI: An API for Distributed Machine Learning", 2013 IEEE 13th International Conference on Data Mining, Oct. 25, 2013, 11 pages.

(Continued)

*Primary Examiner* — Atta Khan
(74) *Attorney, Agent, or Firm* — KDB

(57) ABSTRACT

Techniques and apparatus for an interactive element presentation process are described. In one embodiment, for example, an apparatus may include logic operative to store a plurality of model specifications for computational models, monitor the object storage service for at least one model event using a first serverless computing service, provide the plurality of model specifications associated with the at least one model event to one of a plurality of serverless computing clusters, generate model data for each of the plurality of model specifications, store the model data for each of the plurality of computational models in the object storage service, monitor the object storage service for at least one data event associated with the model data using a second serverless computing service, cause the plurality of instances to generate a plurality of trained model specifications based on training of the plurality of computational models. Other embodiments are described.

20 Claims, 11 Drawing Sheets

(56) References Cited

U.S. PATENT DOCUMENTS

2017/0124487 A1* 5/2017 Szeto ................ G06F 11/1448
2019/0197402 A1 6/2019 Kovacs et al.

OTHER PUBLICATIONS

Dai et al., "BigDL: A Distributed Deep Learning Framework for Big Data", SoCC '19: Proceedings of the ACM Symposium on Cloud Computing, Nov. 2019, 14 pages.

Wang et al., "Distributed Machine Learning with a Serverless Architecture," IEEE INFOCOM 2019—IEEE Conference on Computer Communications, Paris, France, 2019, pp. 1288-1296.

* cited by examiner

500

Store A Plurality Of Model Specifications For A Plurality Of Computational Models Received From A Machine Learning Service In An Object Storage Service
502

Monitor The Object Storage Service For At Least One Model Event Using A First Serverless Computing Service
504

Provide, Via The First Serverless Computing Service Responsive To The At Least One Model Event, Each Of The Plurality Of Model Specifications Associated With The At Least One Model Event To One Of A Plurality Of Serverless Computing Clusters
506

The Serverless Computing Clusters Operative To Generate Model Data For Each Of The Plurality Of Model Specifications, And Store The Model Data For Each Of The Plurality Of Computational Models In The Object Storage Service
508

Monitor The Object Storage Service For At Least One Data Event Associated With The Model Data Using A Second Serverless Computing Service
510

Cause, Via The Second Serverless Computing Service Responsive To The At Least One Data Event, A Plurality Of Instances Of A Cloud-Computing Resource To Be Initiated, The Plurality Of Instances To Generate A Plurality Of Trained Model Specifications Based On Training Of The Plurality Of Computational Models
512

Store The Plurality Of Trained Model Specifications In The Object Storage Service
514

*FIG. 5*

TECHNIQUES FOR PARALLEL MODEL TRAINING

TECHNICAL FIELD

Embodiments herein generally relate to training computational models and, more particularly, for providing processes for simultaneously training a plurality of computational models in parallel.

BACKGROUND

Computational models, such as machine learning (ML) and artificial intelligence (AI) models, require training in order to optimize performance and achieve accurate results. Each modeling project requires training of multiple models. For example, for an image analysis project, there may be multiple models directed to different types of image (e.g., people, objects, etc.), classification strategies, and/or the like. It is time consuming and inefficient to train each model individually, particularly one after another in a serial process. Using conventional technology, computational models, and their associated processes, algorithms, etc., cannot be distributed across machines, networks, and/or the like due to a lack of accurate results and technological constraints requiring the running of each model on one machine at a time. Accordingly, a process for training a plurality of models in parallel would benefit computational model developers.

SUMMARY

This Summary is provided to introduce a selection of concepts in a simplified form that is further described below in the Detailed Description. This Summary is not intended to necessarily identify key features or essential features of the claimed subject matter, nor is it intended as an aid in determining the scope of the claimed subject matter.

In accordance with various aspects of the described embodiments is an apparatus, comprising a storage device and logic, at least a portion of the logic implemented in circuitry coupled to the storage device to perform a parallel model training process. The logic may be operative to store a plurality of model specifications for a plurality of computational models received from a machine learning service in an object storage service, monitor the object storage service for at least one model event using a first serverless computing service, provide, via the first serverless computing service responsive to the at least one model event, each of the plurality of model specifications associated with the at least one model event to one of a plurality of serverless computing clusters, each of the plurality of serverless computing clusters generating model data for each of the plurality of model specifications, and storing the model data for each of the plurality of computational models in the object storage service, monitor the object storage service for at least one data event associated with the model data using a second serverless computing service, cause, via the second serverless computing service responsive to the at least one data event, a plurality of instances of a cloud-computing resource to be initiated, the plurality of instances to generate a plurality of trained model specifications based on training of the plurality of computational models, and store the plurality of trained model specifications in the object storage service.

In some embodiments of the apparatus, the model event may include one of storage of a new model specification in the object storage service or modification of an existing model specification stored in the object storage service. In various embodiments of the apparatus, the data event may include determining available model data for one of the plurality of model specifications. In some embodiments of the apparatus, at least a portion of the model data generated by the plurality of serverless computing clusters via a data preparation process. In various embodiments of the apparatus, the logic may generate a model score for each of the plurality of model specifications. In some embodiments of the apparatus, at least a portion of the plurality of computational models may include different types of computational models operative to perform a different function. In exemplary embodiments of the apparatus, the logic may provide the plurality of model specifications to a training scheduler function operative to store each of the plurality of model specifications as one of a plurality of objects in the object storage service. In some embodiments of the apparatus, the training scheduler function may include a continuous integration platform.

In accordance with various aspects of the described embodiments is a computer-implemented method to perform a parallel model training process. The method may include, via at least one processor of at least one computing device, monitoring an object storage service via a first serverless computing device for at least one model event associated with a plurality of model specifications stored in the object storage service, initiating a plurality of serverless computing clusters responsive to the at least one model event, each of the plurality of serverless computing clusters to generate model data for one of the plurality of model specifications associated with the at least one model event and store the model data in the object storage service, monitoring model data of the object storage service for at least one data event using a second serverless computing service, generating a plurality of instances of a cloud-computing resource to generate a plurality of trained model specifications via training the plurality of computational models using the model data.

In some embodiments of the computer-implemented method, the at least one model event may include one of storage of a new model specification in the object storage service or modification of an existing model specification stored in the object storage service. In various embodiments of the computer-implemented method, the at least one data event may include determining available model data for one of the plurality of model specifications. In some embodiments of the computer-implemented method, at least a portion of the model data generated by the plurality of serverless computing clusters via a data preparation process. In various embodiments of the computer-implemented method, the method may include generating a model score for each of the plurality of model specifications. In some embodiments of the computer-implemented method, at least a portion of the plurality of computational models may include different types of computational models operative to perform a different function. In exemplary embodiments of the computer-implemented method, the method may include providing the plurality of model specifications to a training scheduler function operative to store each of the plurality of model specifications as one of a plurality of objects in the object storage service. In some embodiments of the computer-implemented method, the training scheduler function may include a continuous integration platform.

In accordance with various aspects of the described embodiments is at least one non-transitory computer-readable medium comprising a set of instructions that, in response to being executed via a processing unit of a computing device, cause the computing device to perform a parallel model training process via monitoring an object storage service via a first serverless computing device for at least one model event associated with a plurality of model specifications stored in the object storage service, initiating a plurality of serverless computing clusters responsive to the at least one model event, each of the plurality of serverless computing clusters to generate model data for one of the plurality of computational models associated with the at least one model event and store the model data in the object storage service, monitoring model data of the object storage service for at least one data event using a second serverless computing service, generating a plurality of instances of a cloud-computing resource to generate a plurality of trained model specifications via training the plurality of computational models using the model data.

In some embodiments of the at least one non-transitory computer-readable medium, the at least one model event may include one of storage of a new model specification in the object storage service or modification of an existing model specification stored in the object storage service. In some embodiments of the at least one non-transitory computer-readable medium, the at least one data event may include determining available model data for one of the plurality of model specifications. In some embodiments of the at least one non-transitory computer-readable medium, at least a portion of the plurality of computational models may include different types of computational models operative to perform a different function.

BRIEF DESCRIPTION OF THE DRAWINGS

FIG. 5 illustrates an embodiment of a second logic flow according to some embodiments.

DETAILED DESCRIPTION

Figure 1:
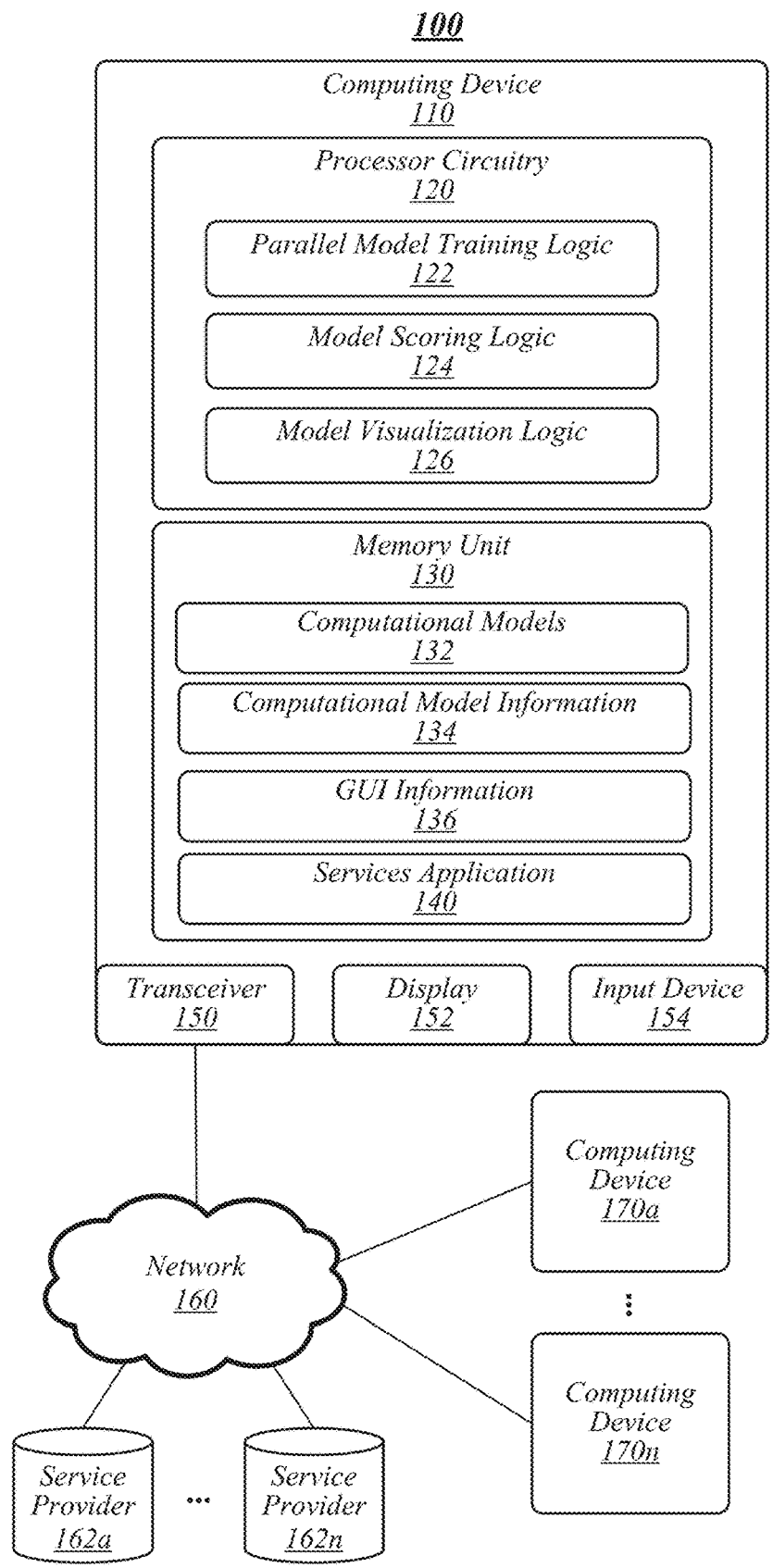
FIG. 1 illustrates an embodiment of a first operating environment according to some embodiments.

Various embodiments may generally be directed toward systems, methods, and/or apparatus for a parallel computational model training process. In some embodiments, parallel computational model training processes may be implemented using various continuous integration (CI) and/or continuous development (CD) processes, components, services, and/or the like. Model training using conventional technology is a serial process, requiring each computational model to be trained individually. Accordingly, some embodiments may provide a parallel computational model training process operative to store a plurality of models, process the plurality of computational models via data preparation techniques and/or model training processes to generate model specifications, while providing for storage of model information generated during the training process.

In addition, various embodiments may generally be directed toward systems, methods, and/or apparatus for a model analysis process. In some embodiments, the model analysis process may include model scoring and/or model selection processes. Conventional systems do not allow developers to score heavy-weight analytical models in parallel nor provide for efficient and accurate automated selection of optimal models. Accordingly, some embodiments may provide a model analysis process that provides for CI and/or CD-based solutions for parallel model scoring and selection techniques.

Furthermore, various embodiments may generally be directed toward systems, methods, and/or apparatus for a model visualization process. In some embodiments, the model visualization process may operate to provide graphical objects, graphical user interfaces (GUIs or UIs) that visualize model data using a backend-heavy and frontend-light approach. For example, some embodiments may use a configuration file from the backend to drive graph specifications. In another example, some embodiments may use a backend-for-frontend (BFF) layer that may be extended to add graphing libraries and/or the GUI may be configured to seamlessly integrate other graphing libraries. Embodiments are not limited in this context.

Accordingly, some embodiments may provide multiple technological advantages over prior art systems. In addition, various embodiments may provide improvements in computing technology and technological features, for instance, by providing more efficient processes for training computational models. Such embodiments may improve, inter alia, the efficiency of computing systems managing or otherwise involved in the development of computational models and/or training, scoring, ranking, and/or selecting computational models. One non-limiting example of a technological advantage may include providing a faster and more efficient process for training computational models because, among other things, a plurality of computational models may be trained accurately in parallel. Other technological advantages are provided by the described embodiments.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include computing device 110 communicatively coupled to (client and/or server) computing devices 1701-n, for example, via network 160. In some embodiments, computing device 110 and/or computing devices 170a-n may be or may include a stand-alone computing device, such as a personal computer (PC), server, tablet computing device, cloud computing device, mobile computing device (for instance, a smart phone, tablet computing device, and/or the like), data appliance, and/or the like. In some embodiments, computing device 110 may include a plurality of computing devices and/or computing systems (for instance, data centers, cloud computing environments, computing clusters, and/or the like).

In various embodiments, computing device 110 may be associated with a service provider 162a-n for providing services for training, scoring, selecting, visualizing (for instance, performance, metrics, and/or the like), or otherwise processing computational models. In some embodiments, service providers 162a-n may include data storage services, CI services, CD services, data processing services, web services, cloud services, Software-as-a-Service (SaaS), other as-a-service functions, and/or the like. Non-limiting examples of services provided by service providers 162a-n may include Amazon® Web Services (AWS), Amazon® Lambda, Amazon® Simple Storage Solution (S3), Amazon® Elastic Map Reduce (EMR), Amazon® Elastic Compute Cloud (EC2), Jenkins automation server, Git software storage and version-control system, variations thereof, equivalents thereof, and/or the like. Although certain services and/or service providers are described in some examples herein, embodiment are not so limited. Services and/or service providers providing functionality that may operate according to some embodiments are contemplated herein and may be used in the place of specifically described services and/or service providers. In some embodiments, computing devices 170a-n may include computing devices used to implement services of service providers 162a-n.

Although only one computing device 110 is depicted in FIG. 1, embodiments are not so limited. In various embodiments, the functions, operations, configurations, data storage functions, applications, logic, and/or the like described with respect to computing device 110 and/or computing devices 170a-n may be performed by and/or stored in one or more other computing devices. A single computing device 110 is depicted for illustrative purposes only to simplify the figure.

As shown in FIG. 1, computing device 110 may include processor circuitry 120, a memory unit 130, a transceiver 150, a display 152 and an input device 154. Processor circuitry 120 may be communicatively coupled to memory unit 130 and/or transceiver 140.

Processor circuitry 120 may include and/or may access various logic for performing processes according to some embodiments. For instance, processor circuitry 120 may include and/or may access parallel model training logic 122, model scoring logic 124, and/or model visualization logic 126. Processing circuitry 120, parallel model training logic 122, model scoring logic 124, model visualization logic 126, and/or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 1100. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although parallel model training logic 122, model scoring logic 124, and/or model visualization logic 126 are depicted in FIG. 1 as being within processor circuitry 120, embodiments are not so limited. For example, parallel model training logic 122, model scoring logic 124, model visualization logic 126, and/or any component thereof, may be located within an accelerator, a processor core, an interface, an individual processor die, implemented entirely as a software application (for instance, services application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store a services application 140 that may operate, alone or in combination with parallel model training logic 122, model scoring logic 124, and/or model visualization logic 126 to perform various functions according to some embodiments. For example, parallel model training logic 122 may operate to perform a parallel model training process according to some embodiments (see, for example, FIGS. 2-5). In another example, model scoring logic 124 may operate to perform a model scoring process according to various embodiments (see, for example, FIGS. 6-8). In a further example, model visualization logic 126 may operate to perform a model visualization process according to some embodiments (see, for example, FIGS. 9 and 10).

Memory unit 130 may store various types of information. For example, in some embodiments, memory unit 130 may store computational models 132. In some embodiments, computational models 132 may be or may include artificial intelligence (AI) and/or machine learning (ML) processes, models, processes, algorithms, networks, constructs, portions thereof, and/or the like. Non-limiting examples of computational models may include an ML model, an AI model, a neural network (NN), an artificial neural network (ANN), a convolutional neural network (CNN), a deep learning (DL) network, a deep neural network (DNN), a recurrent neural network (RNNs), combinations thereof, variations thereof, and/or the like. Embodiments are not limited in this context.

In various embodiments, memory unit 130 may also store computational model information 134 (for instance, specifications, model data, model configurations, and/or the like), GUI information 136 (for instance, GUI objections and/or information used for generating GUI objects for visualizing models), and/or the like. In various embodiments, computational models 132, computational model information 134, and/or GUI information 136 may be stored remotely (not shown) and/or stored or accessed via service providers 162a-n and/or computing devices 170a-n.

Figure 2:
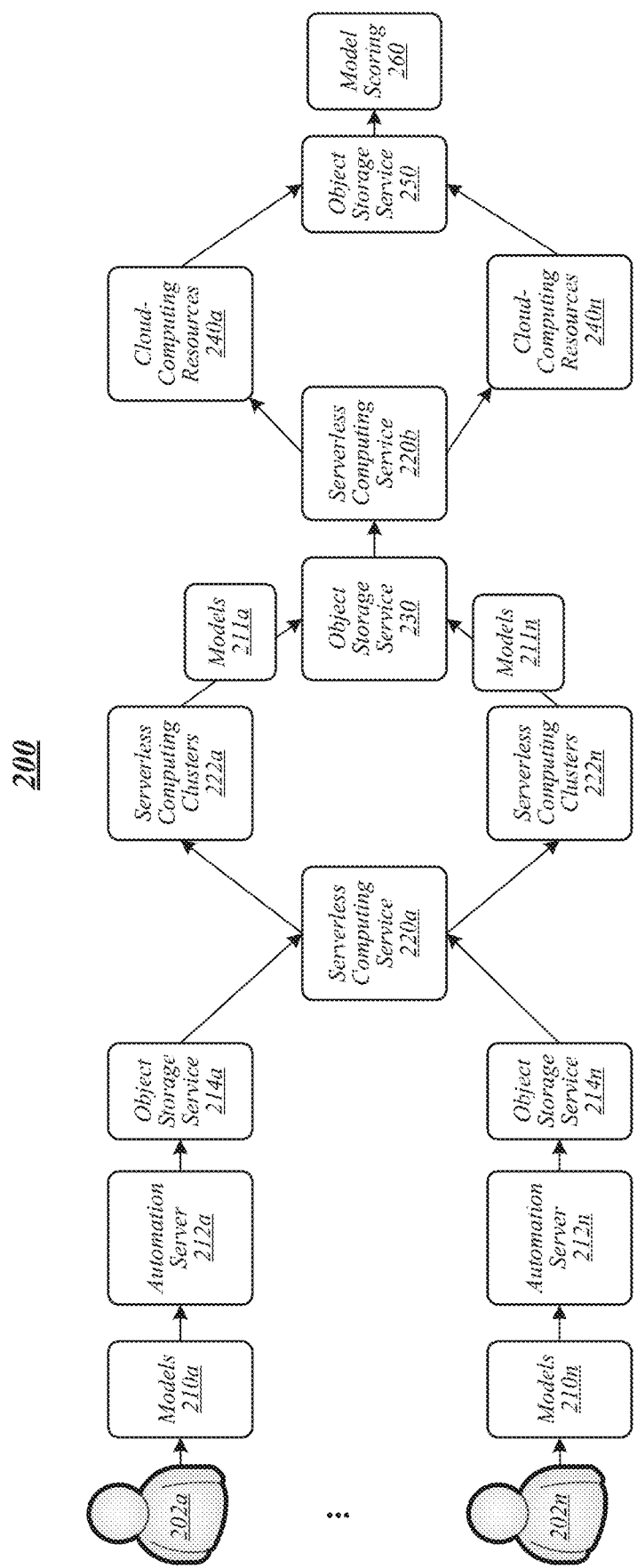
FIG. 2 illustrates an embodiment of a second operating environment according to some embodiments.
Figure 3:
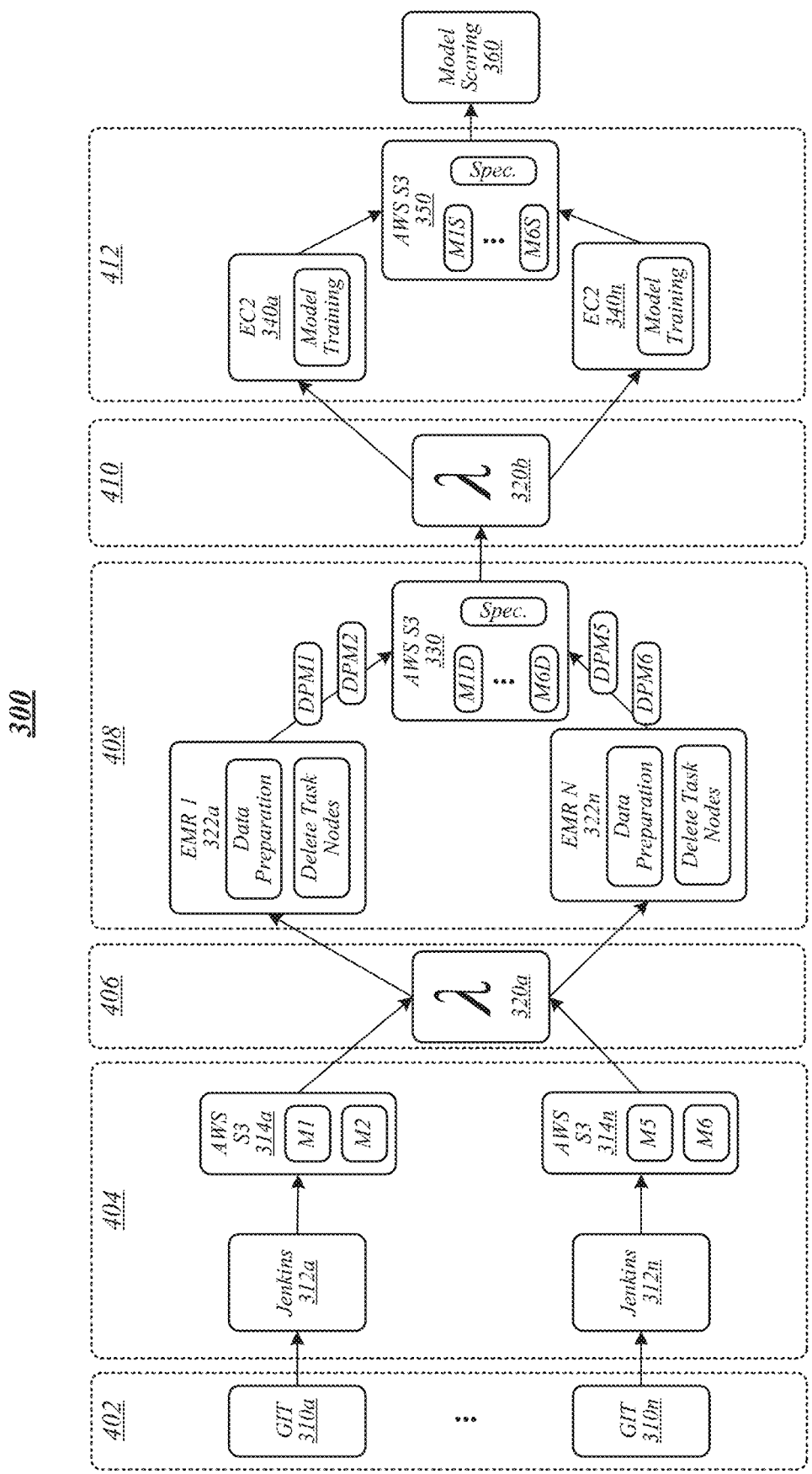
FIG. 3 illustrates an embodiment of a third operating environment according to some embodiments.

FIG. 2 illustrates an example of an operating environment 200 that may be representative of some embodiments (see, for example, FIG. 3 for a non-limiting example implementation of operating environment 200 according to some embodiments). As shown in FIG. 2, users 202a-n (for instance, a computational model developer) may provide a plurality of models 210a-n to an automation server 212a-n, which may store models 210a-n in an object storage service 214a-n. A first serverless computing service 220a may access models 210a-n from object storage services 214a-n. For example, serverless computing services may include services, for instance, event-driven services, that run code in response to events and automatically manages underlying computing resources. Serverless computing services may be cloud-based services. For each of models 210a-n, first serverless computing service 220a may generate a serverless computing cluster 222a-n. In some embodiments, each serverless computing cluster 222a-n may process a model 210a-n, for example, performing data preparation services and/or deleting task nodes to generate models 211a-n. Model data and/or model specifications for each of models 211a-n may be stored in object storage service 230.

In various embodiments, a second serverless computing services 220b may access models 211a-n (or data and/or specifications associated therewith) from object storage service 230 and generate cloud-computing resources 240a-n to perform model training on models 211a-n. Model specifications resulting from the model training may be stored in object storage service 250. In some embodiments, the model specifications may be available for various processes, such as model scoring 260. In some embodiments, operating environment 200 may manage, support, facilitate, or otherwise handle interdependency between models. For example, models trained via serverless computing clusters 240a-n may be dependent on the results/scores from models trained via serverless computing clusters 222a-n. In other words, serverless computing clusters 222a-n may train models 210a-n, while serverless computing clusters 240a-n may train models 211a-n, which need to wait for 210a-n to finish training to start.

FIG. 3 illustrates an example of an operating environment 300 that may be representative of some embodiments. More specifically, FIG. 3 depicts an embodiment of an implementation of operating environment 200 according to some embodiments.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 4:
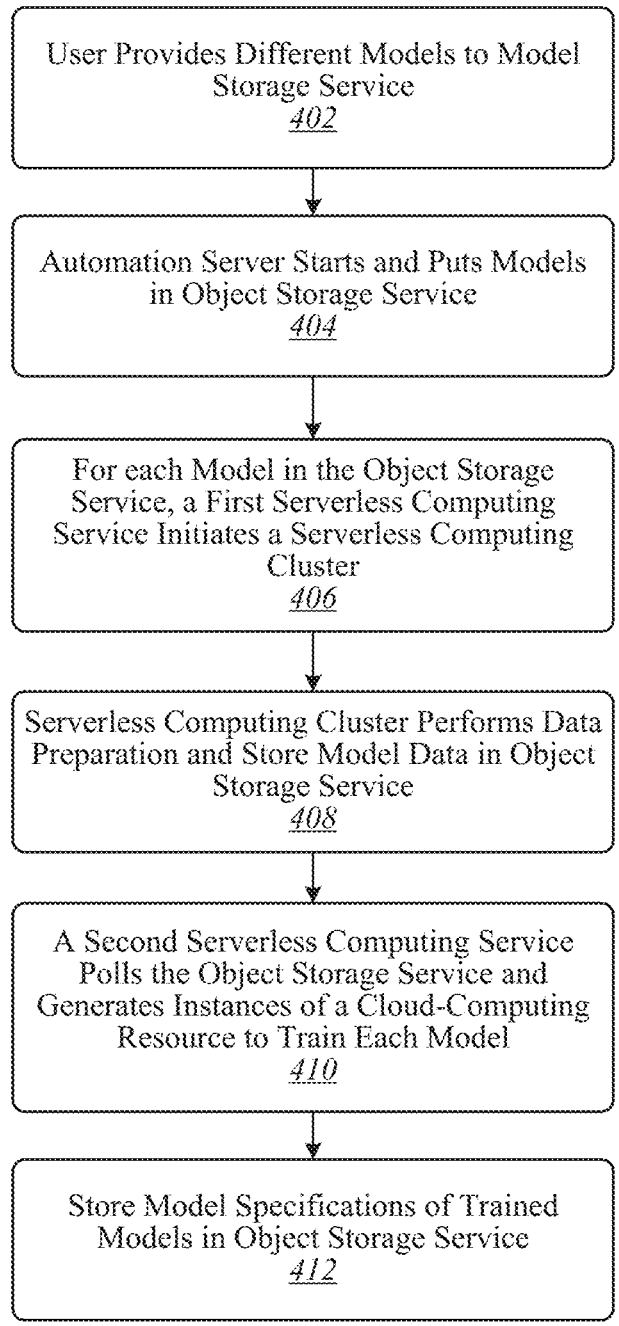
FIG. 4 illustrates an embodiment of a first logic flow according to some embodiments.

FIG. 4 illustrates an embodiment of a logic flow 400. Logic flow 400 may be representative of some or all of the operations executed by one or more embodiments described herein, such as computing device 110. Logic flow 400 may be representative of some or all of the operations of a parallel model training process according to some embodiments, for example, according to operating environment 300 depicted in FIG. 3 (for instance, boxes 402-412 of FIG. 3 correspond to blocks 402-412 of FIG. 4).

At block 402, logic flow 400 may provide different models to a model storage service. For example, a plurality of computational models may be provided to a Git open-source software version control system. Logic flow 400 may start an automation server and put the models in an object storage service at block 404. For example, Jenkins automation server services 312a-n may be initiated and store models for training (i.e., M1-M6) in an AWS S3 314a-n. In some embodiments, Jenkins 312a-n may operate to put the model specifications in AWS S3 314a-n. In general, Jenkins services 312a-n may operate to automate certain software development functions, including CI and CD functions.

At block 406, for each model in the object storage service, a first serverless computing service initiates a serverless computing cluster. For example, AWS lambda 320a (i.e., serverless computing service) may initiate an EMR 322a-n (i.e., serverless computing cluster) for each model specification detected in AWS S3. Logic flow 400 may use the serverless computing cluster to perform data preparation and store model data in the object storage service at block 408. For example, EMRs 322a-n may perform data preparation for each model (i.e., data preparation (DP) for models M1-M6 or DPM1-6) and put the model data (M1D-M6D) in AWS S3 330.

Logic flow 400 may poll, via a second serverless computing service, the object storage service and generate instances of a cloud-computing resource to train each model at block 410. For example, AWS lambda 320b process may poll AWS S3 330 and generate EC2 340a-n instances to train each model that becomes available in AWS S3 330. At block 412, logic flow 400 may store model specifications of trained models in an object storage service. For example, EC2 340a-n may perform model training and store resulting specifications (i.e., M1S-M6S) in AWS S3 350. In some embodiments, models specifications stored in AWS S3 350 may be used or otherwise available for model scoring 360 according to conventional methods and/or according to some embodiments.

FIG. 5 illustrates an embodiment of a logic flow 500. Logic flow 500 may be representative of some or all of the operations executed by one or more embodiments described herein, such as computing device 110. Logic flow 500 may be representative of some or all of the operations of a parallel model training process according to some embodiments.

At block 502, logic flow 500 may store a plurality of model specifications for a plurality of computational models received from a machine learning service in an object storage service. Logic flow 500 may monitor the object storage service for at least one model event using a first serverless computing service at block 504. In some embodiments, at block 506, logic flow 500 may provide, via the first serverless computing service responsive to the at least one model event, each of the plurality of model specifications associated with the at least one model event to one of a plurality of serverless computing clusters. At block 508, logic flow 500 may, via the serverless computing clusters, generate model data for each of the plurality of model specifications, and store the model data for each of the plurality of computational models in the object storage service.

Logic flow 500 may monitor the object storage service for at least one data event associated with the model data using a second serverless computing service at block 510. In some embodiments, at block 512, logic flow 500 may cause, via the second serverless computing service responsive to the at least one data event, a plurality of instances of a cloud-computing resource to be initiated, the plurality of instances to generate a plurality of trained model specifications based on training of the plurality of computational models. Logic flow 500 may store the plurality of trained model specifications in the object storage service at block 514.

Figure 6:
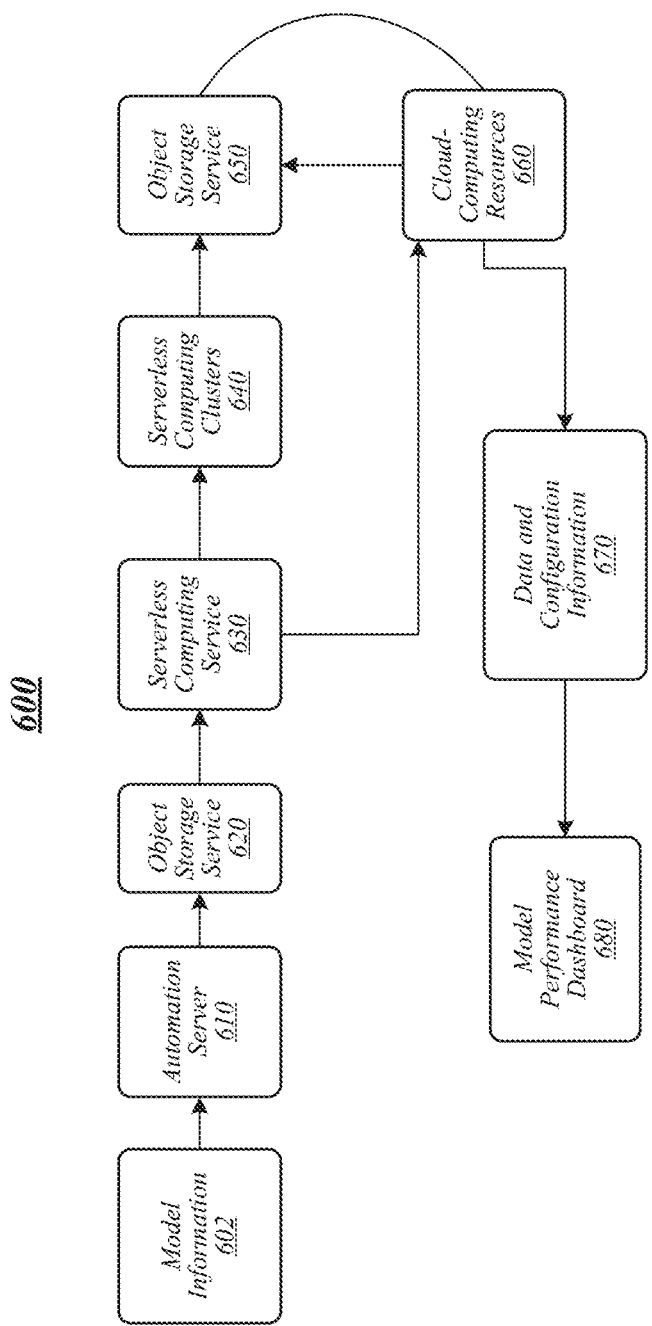
FIG. 6 illustrates an embodiment of a fourth operating environment according to some embodiments.

FIG. 6 illustrates an embodiment of an operating environment 600 according to some embodiments. For example, operating environment 600 may operate to implement a model scoring process according to some embodiments.

As shown in FIG. 6, model information 602 may be provided to an automation server 610. In some embodiments, model information 602 may include models, model specifications, model configurations, and/or the like. Automation server 610 may store model information 602 in an object storage service 620. A serverless computing service 630 may access model information 620 in object storage service 620 and provide model information 602 to one or more serverless computing clusters 640.

In various embodiments, serverless computing clusters 640 may operate to generate score information via scoring models associated with model information 602. Score information may be stored in object storage service 650 for retrieval by cloud-computing resources 660. In exemplary embodiments, cloud-computing resources 660 may operate to generate data and configuration information 670 that may be used to provide graphical information presented via a model performance dashboard 680.

Figure 7:
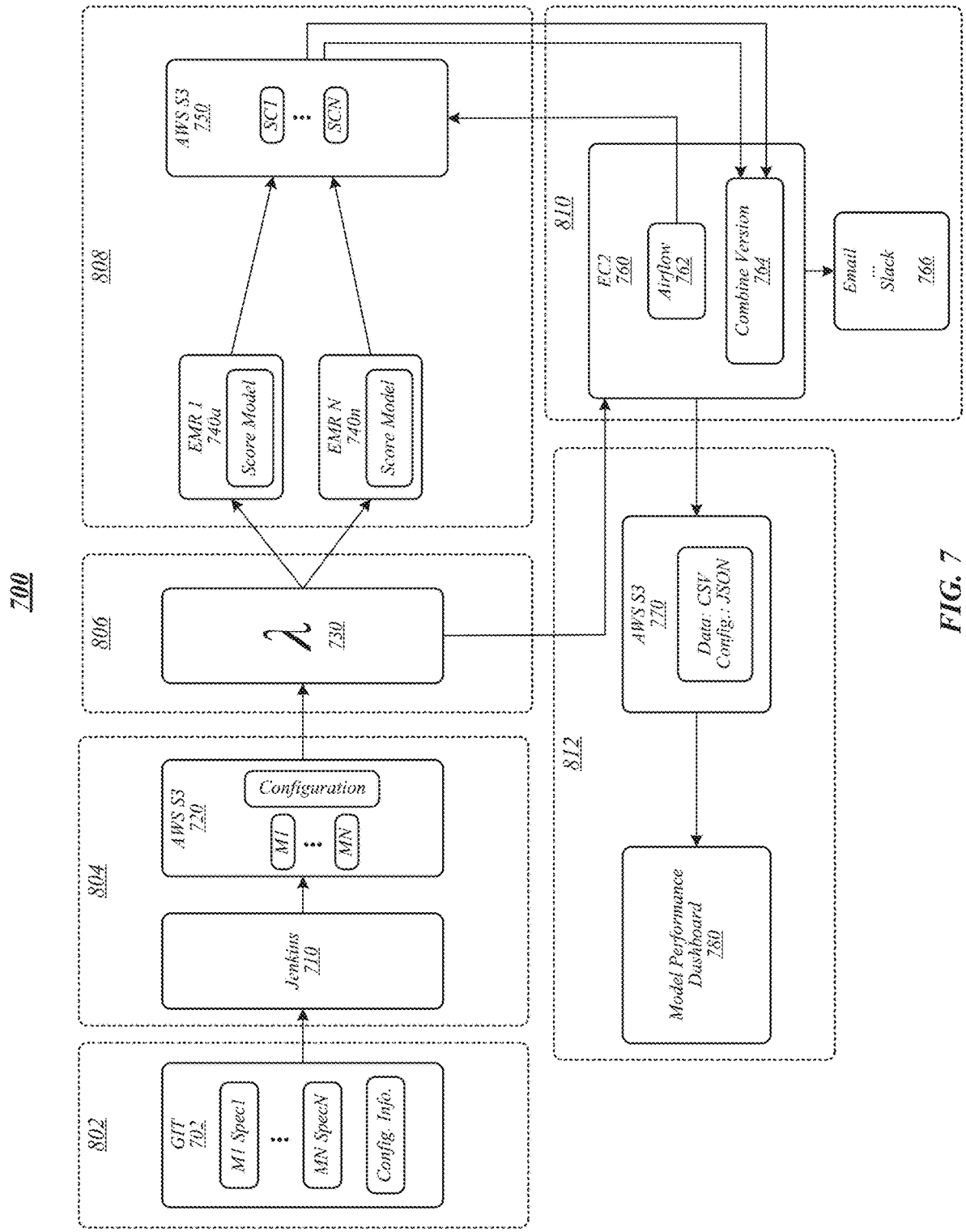
FIG. 7 illustrates an embodiment of a fifth operating environment according to some embodiments.

FIG. 7 illustrates an embodiment of an operating environment 700 according to some embodiments. For example, operating environment 700 may operate to implement a model scoring process according to some embodiments.

Figure 8:
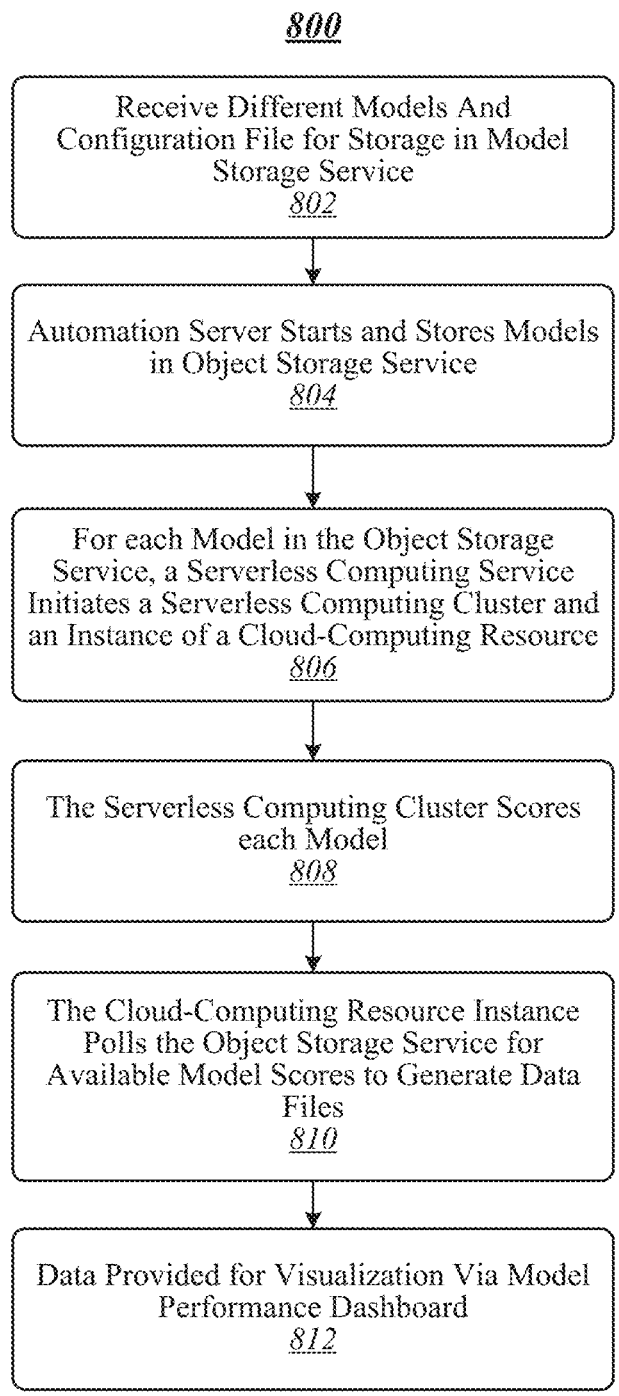
FIG. 8 illustrates an embodiment of a third logic flow according to some embodiments.

Relating to FIG. 7, FIG. 8 illustrates an embodiment of a logic flow 800 that may be representative of some or all of the operations executed by one or more embodiments described herein, such as computing device 110. Logic flow 800 may be representative of some or all of the operations of a model scoring process according to some embodiments, for example, according to operating environment 700 depicted in FIG. 7 (for instance, boxes 802-812 of FIG. 7 correspond to blocks 802-812 of FIG. 8).

Referring to FIG. 8, logic flow 800 may receive different models and/or configuration files for storage in a model storage service at block 802. For example, a user may check in different model specifications (for instance M1 Spec1-MN Spec N) in Git 702 along with configuration information, such as one or more configuration files. At block 804, logic flow 800 may cause an automation server to start and store models (and/or configuration information) in an object storage service. For example, a Jenkins 710 job may be initiated to put model specifications into AWS S3 720.

At block 806, logic flow 800 may cause, for each model in the object storage service, a serverless computing service to initiate a serverless computing cluster and an instance of a cloud-computing resource. For example, for each model specification in AWS S3 720, AWS lambda 730 may initiate an EMR 740a-n and create an EC2 760 instance for each configuration. Logic flow 800 may cause the serverless computing cluster to score each model at block 808. For example, EMRs 740a-n may score each model and store the model scores (for instance, SC1-SCN) in an object storage service, such as AWS S3 750.

At block 810, logic flow 800 may cause the cloud-computing resource instance to poll the object storage service for available model scores to generate data files. For example, EC2 760 may include an Apache™ Airflow™ process 762, provided by The Apache Software Foundation, (or other workflow manager service) with an AWS S3 sensor to continually poll AWS S3 750 until model scores are available for all the different types of specifications, configurations, and/or the like. Once all of the different model scores are available, the data may be combined 764 (for instance, as *.csv data, JSON data, and/or the like) and combined data 764 may be stored in AWS S3 770 and/or provided to the user via a service 766 (for instance, email, collaboration services (for example, Slack), messaging services, and/or the like).

At block 812, logic flow 800 may cause visualization of the data via a model performance dashboard. For example, data stores in AWS S3 770 may be used by model performance dashboard 780 to visualize the model scoring results. In some embodiments, for instance, visualization of scoring data via model performance dashboard may facilitate selection of an optimal or best performing model.

Figure 9:
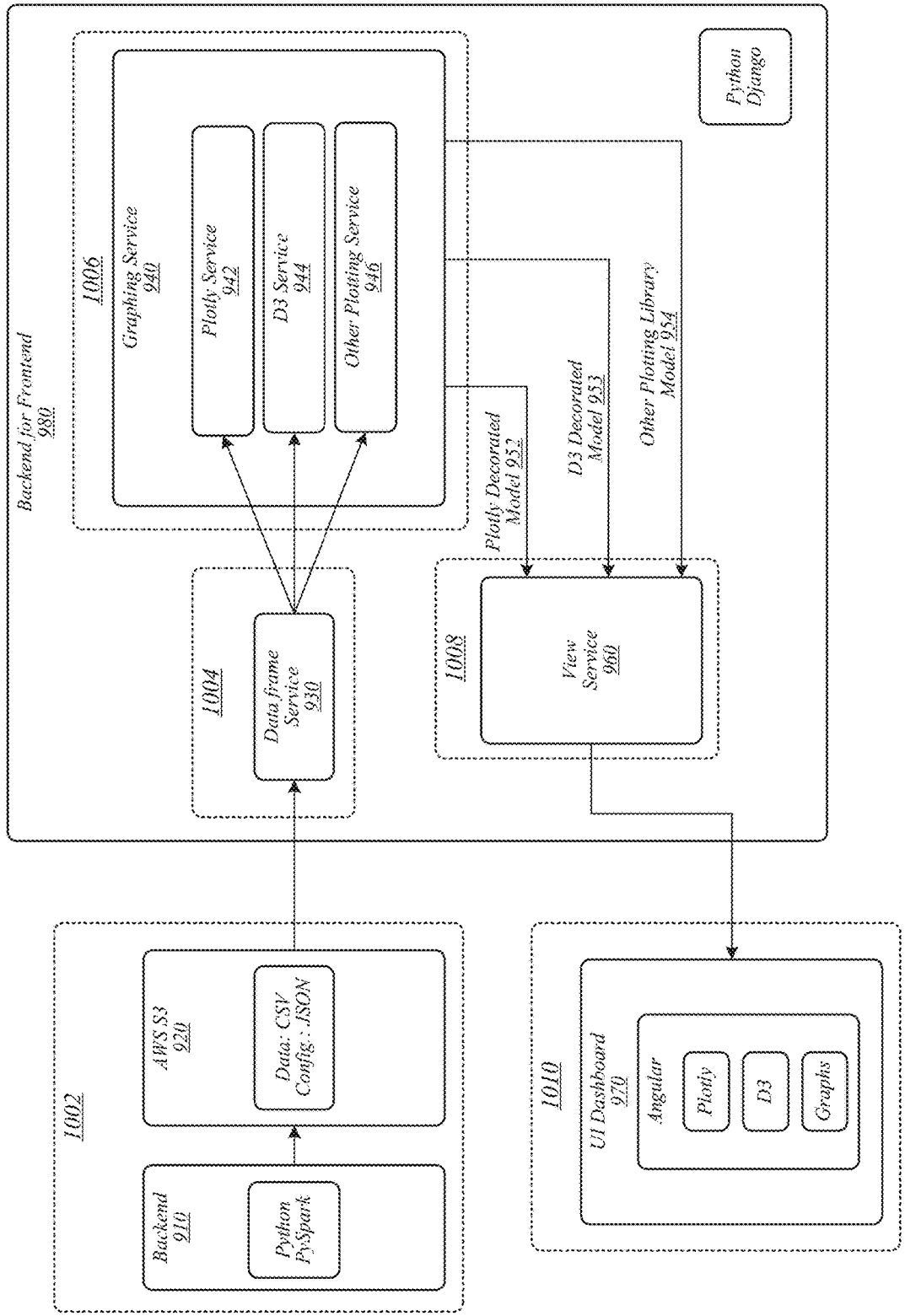
FIG. 9 illustrates an embodiment of a sixth operating environment according to some embodiments.

FIG. 9 illustrates an embodiment of an operating environment 900 according to some embodiments. For example, operating environment 900 may operate to implement a model visualization process according to some embodiments.

Figure 10:
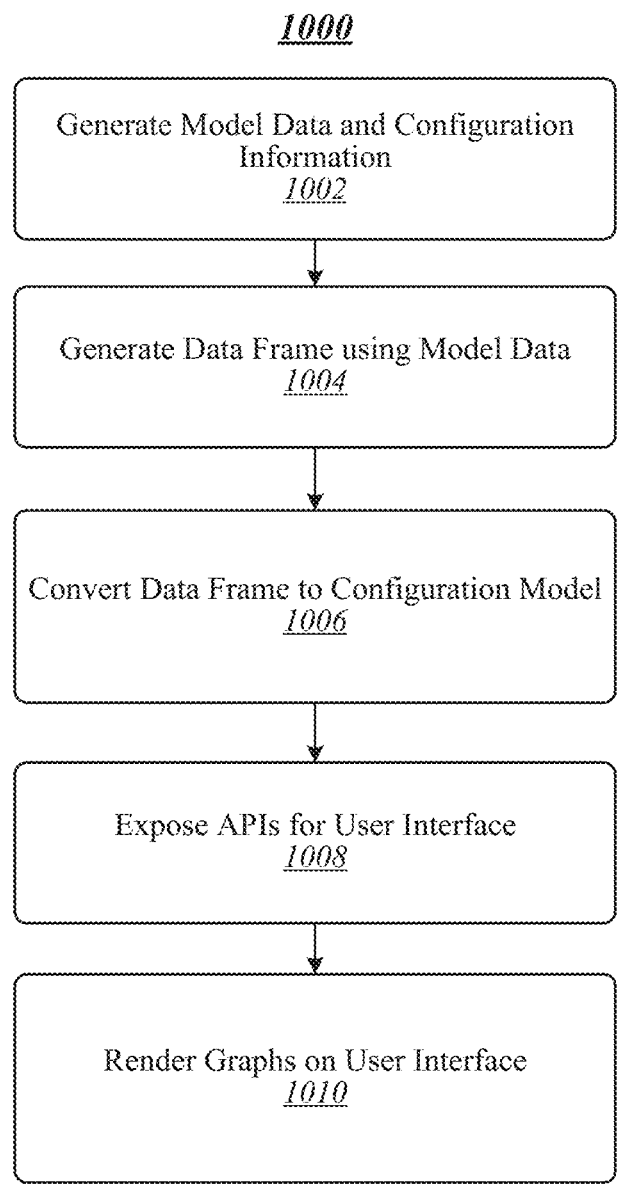
FIG. 10 illustrates an embodiment of a fourth logic flow according to some embodiments.

Relating to FIG. 9, FIG. 10 illustrates an embodiment of a logic flow 1000 that may be representative of some or all of the operations executed by one or more embodiments described herein, such as computing device 110. Logic flow 1000 may be representative of some or all of the operations of a model visualization process according to some embodiments, for example, according to operating environment 900 depicted in FIG. 9 (for instance, boxes 1002-1010 of FIG. 9 corresponding to blocks 1002-1010 of FIG. 10).

Referring to FIG. 10, logic flow 1000 may generate model data and configuration information at block 1002. For example, a backend process 910 may produce data (for instance *.csv data) and configuration information (for instance, JSON data) stored in an object storage service 920, such as AWS S3. In some embodiments, the configuration information (for instance, JSON data) may contain generic graph specifications. At block 1004, logic flow 1000 may generate a data frame using the model data. For example, within a backend-for-frontend (BFF) service 980, a data frame service 930 may take the model data and generate a data frame (for instance, a two-dimensional tabular data structure formed of rows and columns), such as a Pandas dataframe (or other two-dimensional data structures).

At block 1006, logic flow 1000 may convert the data frame to a configuration model. For example, a graphing service 940 may access the data frame from data frame service 930. Graphing service 940 may convert the data frame (Pandas dataframe, for instance) into one or more models 952-954 using various graphing/plotting/visualization services and/or libraries, such as a Plotly service and/or library 942, a D3 service and/or library 944, and/or other plotting services 946. In one embodiment, for example, the model may be or may include a JSON model converted from a Pandas dataframe using JSON configuration information that may be understood by corresponding UI graphic libraries (for instance, Plotly service 942, D3 service 944, and/or the like), thereby making the framework extensible for other graphing libraries and driven by data.

Logic flow 1000 may expose application programming interfaces (APIs) for a user interfaces (UIs) at block 1008. For example, a view service 960 may receive models 952-954 and expose APIs for a UI to consume to provide visualized data. At block 1010, logic flow 1000 may render graphs on the UI. For example, UI dashboard 970 may be used to present one or more graphs or other data. In some embodiments, the graphs may be presented via a web application, for instance, implemented via Angular provided by Google™. In various embodiments using JSON, UI dashboard 970 may render a UI with graphs, or other information, presented based on the JSON model data.

Figure 11:
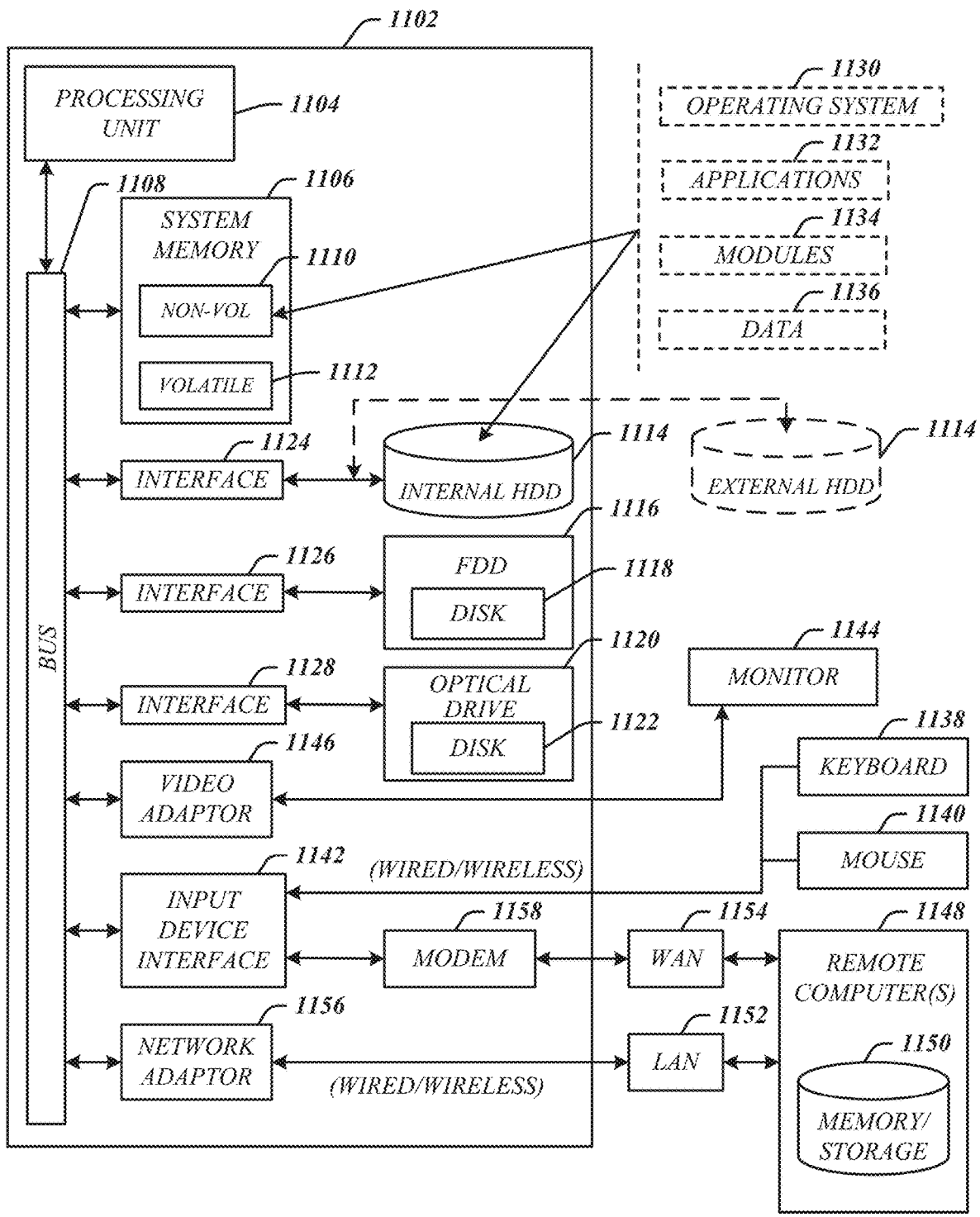
FIG. 11 illustrates an embodiment of a computing architecture according to some embodiments.

FIG. 11 illustrates an embodiment of an exemplary computing architecture 1100 suitable for implementing various embodiments as previously described. In various embodiments, the computing architecture 1100 may comprise or be implemented as part of an electronic device. In some embodiments, the computing architecture 1100 may be representative, for example, of computing device 110. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of computing device 110

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108 but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154 or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a storage device; and
   logic, at least a portion of the logic implemented in circuitry coupled to the storage device to perform a parallel model training process, the logic to:
   store a plurality of model specifications for a plurality of computational models received from a machine learning service in an object storage service,
   monitor the object storage service for at least one model event using a first serverless computing service,
   provide, via the first serverless computing service responsive to the at least one model event, each of the plurality of model specifications associated with the at least one model event to one of a plurality of serverless computing clusters, each of the plurality of serverless computing clusters:
   generating model data for each of the plurality of model specifications, and
   storing the model data for each of the plurality of computational models in the object storage service,
   monitor the object storage service for at least one data event associated with the model data using a second serverless computing service,
   cause, via the second serverless computing service responsive to the at least one data event, a plurality of instances of a cloud-computing resource to be initiated, the plurality of instances to generate a plurality of trained model specifications based on training of the plurality of computational models, and
   store the plurality of trained model specifications in the object storage service.

2. The apparatus of claim 1, the model event comprising one of storage of a new model specification in the object storage service or modification of an existing model specification stored in the object storage service.

3. The apparatus of claim 1, the data event comprising determining available model data for one of the plurality of model specifications.

4. The apparatus of claim 1, at least a portion of the model data generated by the plurality of serverless computing clusters via a data preparation process.

5. The apparatus of claim 1, the logic to generate a model score for each of the plurality of model specifications.

6. The apparatus of claim 1, at least a portion of the plurality of computational models comprising different types of computational models operative to perform a different function.

7. The apparatus of claim 1, the logic to provide the plurality of model specifications to a training scheduler function operative to store each of the plurality of model specifications as one of a plurality of objects in the object storage service.

8. The apparatus of claim 7, the training scheduler function comprising a continuous integration platform.

9. A computer-implemented method to perform a parallel model training process, the method comprising, via at least one processor of at least one computing device:
   monitoring an object storage service via a first serverless computing device for at least one model event associated with a plurality of model specifications stored in the object storage service;
   initiating a plurality of serverless computing clusters responsive to the at least one model event, each of the plurality of serverless computing clusters to generate model data for one of the plurality of model specifications associated with the at least one model event and store the model data in the object storage service,
   monitoring model data of the object storage service for at least one data event using a second serverless computing service,
   generating a plurality of instances of a cloud-computing resource to generate a plurality of trained model specifications via training the plurality of computational models using the model data.

10. The computer-implemented method of claim 9, the at least one model event comprising one of storage of a new model specification in the object storage service or modification of an existing model specification stored in the object storage service.

11. The computer-implemented method of claim 9, the at least one data event comprising determining available model data for one of the plurality of model specifications.

12. The computer-implemented method of claim 9, at least a portion of the model data generated by the plurality of serverless computing clusters via a data preparation process.

13. The computer-implemented method of claim 9, comprising generating a model score for each of the plurality of model specifications.

14. The computer-implemented method of claim 9, at least a portion of the plurality of computational models comprising different types of computational models operative to perform a different function.

15. The computer-implemented method of claim 9, comprising providing the plurality of model specifications to a training scheduler function operative to store each of the plurality of model specifications as one of a plurality of objects in the object storage service.

16. The computer-implemented method of claim 15, the training scheduler function comprising a continuous integration platform.

17. At least one non-transitory computer-readable medium comprising a set of instructions that, in response to being executed via a processing unit of a computing device, cause the computing device to perform a parallel model training process via:
   monitoring an object storage service via a first serverless computing device for at least one model event associated with a plurality of model specifications stored in the object storage service;
   initiating a plurality of serverless computing clusters responsive to the at least one model event, each of the plurality of serverless computing clusters to generate model data for one of the plurality of computational models associated with the at least one model event and store the model data in the object storage service, monitoring model data of the object storage service for at least one data event using a second serverless computing service, generating a plurality of instances of a cloud-computing resource to generate a plurality of trained model specifications via training the plurality of computational models using the model data.

18. The at least one non-transitory computer-readable medium of claim 17, the at least one model event comprising one of storage of a new model specification in the object storage service or modification of an existing model specification stored in the object storage service.

19. The at least one non-transitory computer-readable medium of claim 17, the at least one data event comprising determining available model data for one of the plurality of model specifications.

20. The at least one non-transitory computer-readable medium of claim 17, at least a portion of the plurality of computational models comprising different types of computational models operative to perform a different function.

\* \* \* \* \*